US012703000B2

(12) United States Patent
Park et al.

(10) Patent No.: US 12,703,000 B2
(45) Date of Patent: Aug. 11, 2026

(54) DIE COATER CAPABLE OF MULTI-LAYER COATING OF ACTIVE MATERIALS

(71) Applicant: LG Energy Solution, Ltd., Seoul (KR)

(72) Inventors: Joon Sun Park, Daejeon (KR); Shin Wook Jeon, Daejeon (KR); Taek Soo Lee, Daejeon (KR); Man Hyeong Kim, Daejeon (KR); Min Hyuck Choi, Daejeon (KR); Guk Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 447 days.

(21) Appl. No.: 18/562,599

(22) PCT Filed: Apr. 4, 2023

(86) PCT No.: PCT/KR2023/004512
§ 371 (c)(1),
(2) Date: Nov. 20, 2023

(87) PCT Pub. No.: WO2023/195733
PCT Pub. Date: Oct. 12, 2023

(65) Prior Publication Data

US 2024/0246108 A1 Jul. 25, 2024

(30) Foreign Application Priority Data

Apr. 5, 2022 (KR) ........................ 10-2022-0042443

(51) Int. Cl.
*B05C 5/02* (2006.01)
*B05C 9/06* (2006.01)
*H01M 4/04* (2006.01)

(52) U.S. Cl.
CPC ............. *B05C 5/0262* (2013.01); *B05C 9/06* (2013.01); *H01M 4/0404* (2013.01)

(58) Field of Classification Search
CPC B05C 5/0262; B05C 9/06; B05C 5/02; B05C 9/04; B05C 11/10; B05C 5/0254; H01M 4/0404; H01M 4/04; Y02E 60/10
See application file for complete search history.

(56) References Cited

U.S. PATENT DOCUMENTS 5,962,075 A * 10/1999 Sartor ........................ B05C 9/06 118/411
12,377,435 B2 * 8/2025 Lee ........................ B05C 5/0254
(Continued)

FOREIGN PATENT DOCUMENTS

CN 205253457 U 5/2016
CN 109107829 A 1/2019
(Continued)

OTHER PUBLICATIONS

International Search Report for PCT/KR2023/004512 mailed Jul. 11, 2023. 3 pages.
(Continued)

*Primary Examiner* — Nahida Sultana
(74) *Attorney, Agent, or Firm* — Lerner David LLP

(57) ABSTRACT

A die coater capable of simultaneously coating a current collector with two different liquids in multiple layers includes a first body with a first manifold for an electrode slurry, a second body with a second manifold coupled to the first body to form a first slit through which the electrode slurry in the first manifold is discharged, and a third body coupled to the second body to form a second slit through which the electrode slurry in the second manifold is discharged. The first slit is formed by a first and third shim that are interposed between coupling surfaces of the first and second body, and the second slit is formed by a second and fourth shim that are interposed between coupling surfaces of
(Continued)

the second and third body, and at least any one of the third shim and the fourth shim forms an insulating liquid slit.

12 Claims, 9 Drawing Sheets

(56) References Cited

U.S. PATENT DOCUMENTS

| | | | |
|---|---|---|---|
| 2012/0251726 | A1 | 10/2012 | Kuniyasu et al. |
| 2019/0374971 | A1 | 12/2019 | Horinouchi et al. |
| 2020/0136133 | A1 | 4/2020 | Umehara |
| 2022/0016665 | A1 | 1/2022 | Lee et al. |
| 2022/0134378 | A1 | 5/2022 | Kim et al. |
| 2023/0133585 | A1 | 5/2023 | Lee et al. |
| 2024/0050975 | A1 | 2/2024 | Lee et al. |

FOREIGN PATENT DOCUMENTS

| | | | |
|---|---|---|---|
| CN | 109261438 | A | 1/2019 |
| CN | 110112361 | A | 8/2019 |
| CN | 213612390 | U | 7/2021 |
| JP | 2005137974 | A | 6/2005 |
| JP | 2005270704 | A | 10/2005 |
| JP | 5346972 | B2 | 11/2013 |
| JP | 2019107606 | A | 7/2019 |
| JP | 2020011168 | A | 1/2020 |
| JP | 202028839 | A | 2/2020 |
| JP | 2020072007 | A | 5/2020 |
| JP | 6794473 | B2 | 12/2020 |
| JP | 2021010867 | A | 2/2021 |
| JP | 2021030124 | A | 3/2021 |
| JP | 2021517067 | A | 7/2021 |
| JP | 2021120148 | A | 8/2021 |
| JP | 2022501177 | A | 1/2022 |
| JP | 2024106129 | A | 8/2024 |
| KR | 20030018925 | A | 3/2003 |
| KR | 100966708 | B1 | 6/2010 |
| KR | 20150008027 | A | 1/2015 |
| KR | 20170037384 | A | 4/2017 |
| KR | 101767515 | B1 | 8/2017 |
| KR | 20190034523 | A | 4/2019 |
| KR | 20190096114 | A | 8/2019 |
| KR | 102035826 | B1 | 10/2019 |
| KR | 102067799 | B1 | 2/2020 |
| KR | 20200011227 | A | 2/2020 |
| KR | 20210155879 | A | 12/2021 |
| WO | 2020231141 | A1 | 11/2020 |
| WO | 2022/065711 | A1 | 3/2022 |
| WO | 2022060177 | A1 | 3/2022 |

OTHER PUBLICATIONS

Extended European Search Report including Written Opinion for Application No. 23784957.5 dated Oct. 9, 2024, pp. 1-8.

Search Report dated Mar. 30, 26 from the Office Action for Chinese Application No. 202380011801.5 issued Apr. 1, 2026, 2 pages.

* cited by examiner

[FIG. 1]
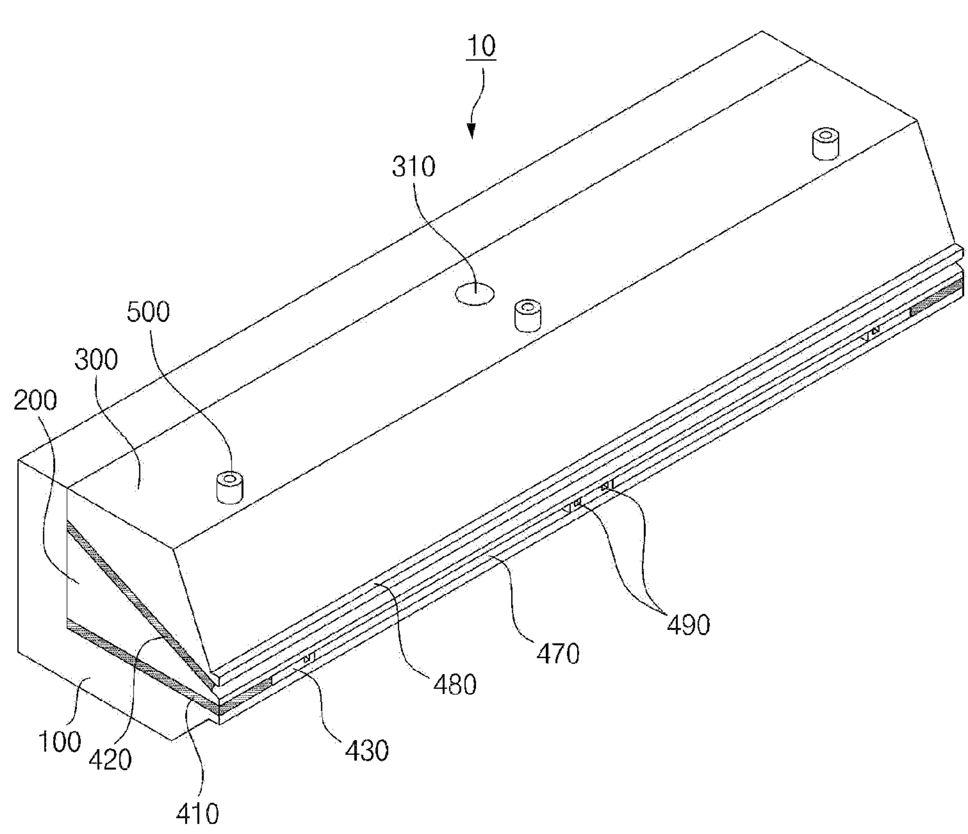

[FIG. 2]
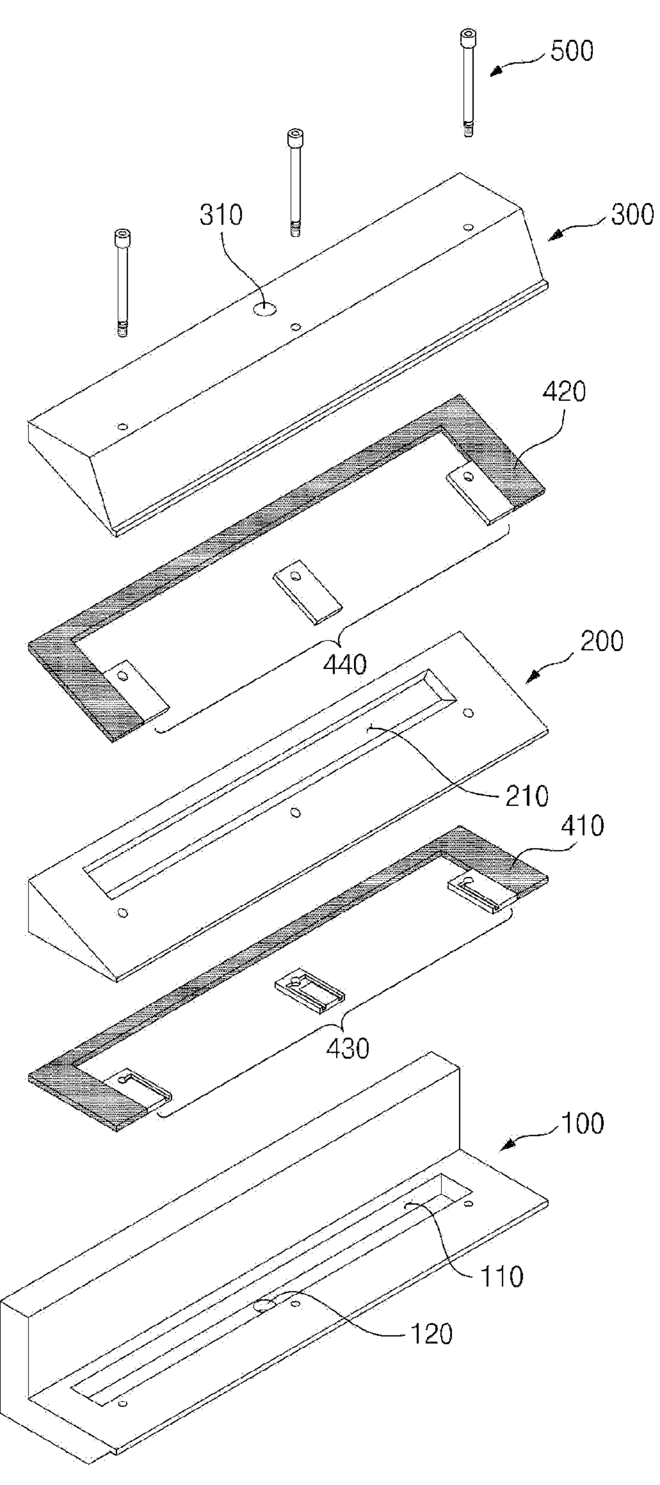

[FIG. 3]
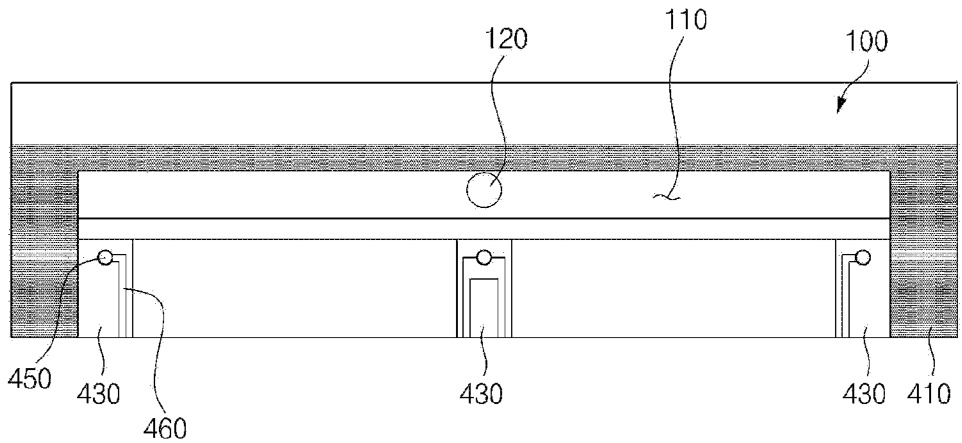
[FIG. 4]
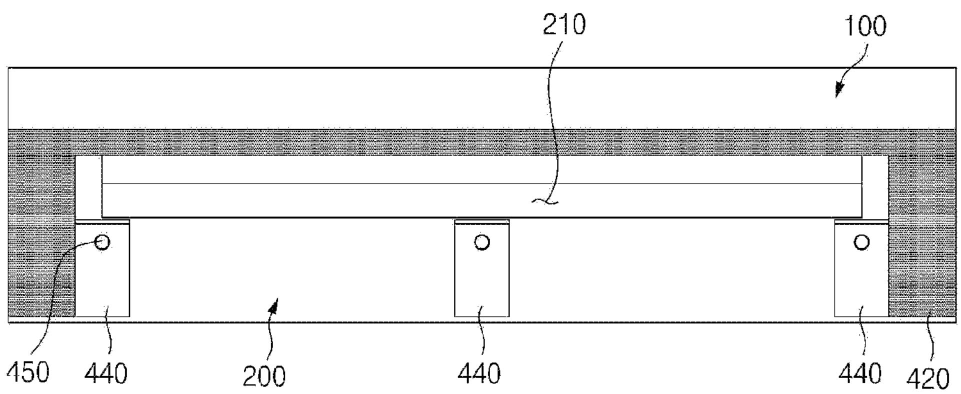

[FIG. 5]
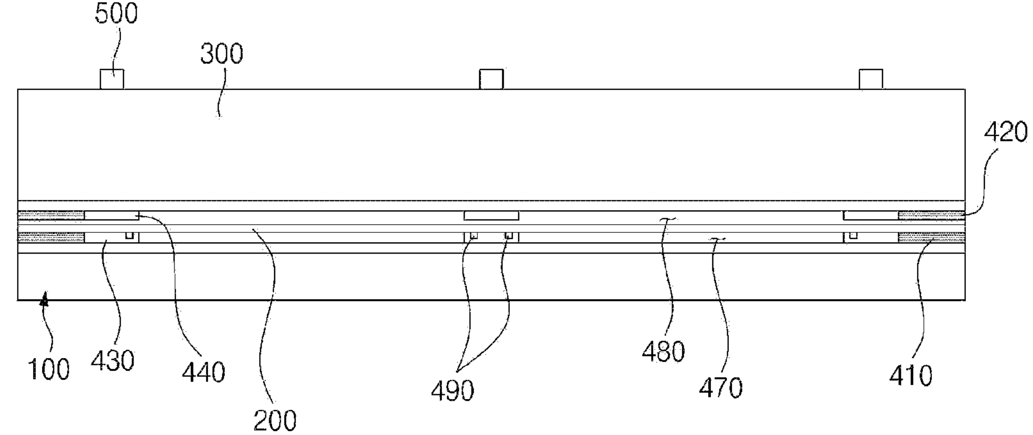
[FIG. 6]
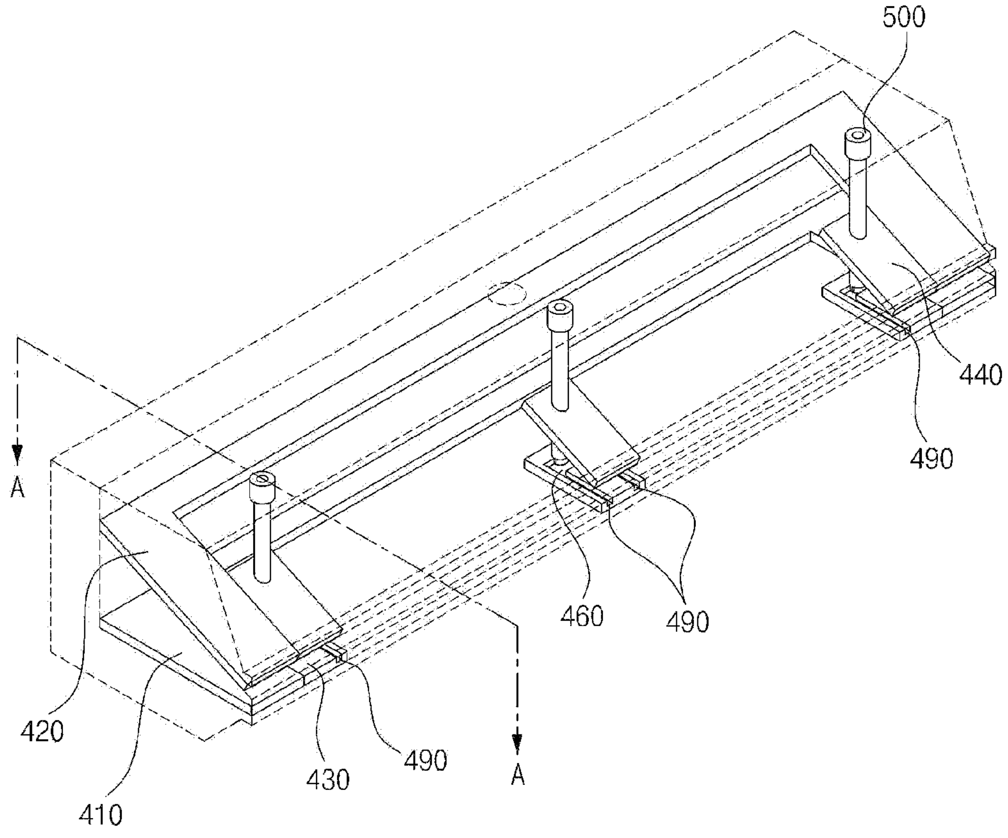

[FIG. 7]
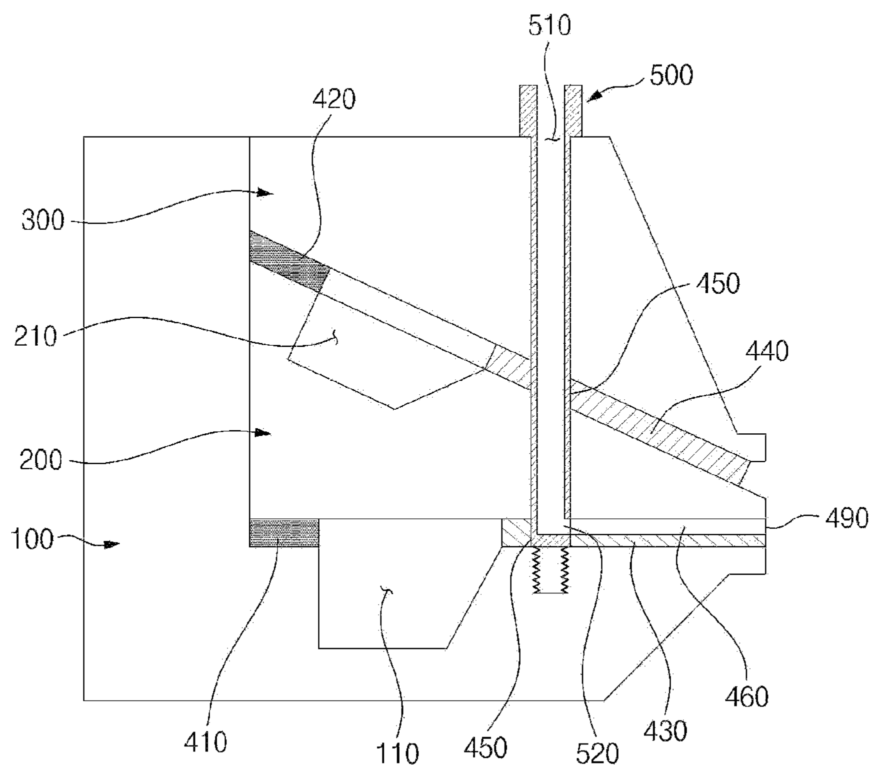

[FIG. 8]
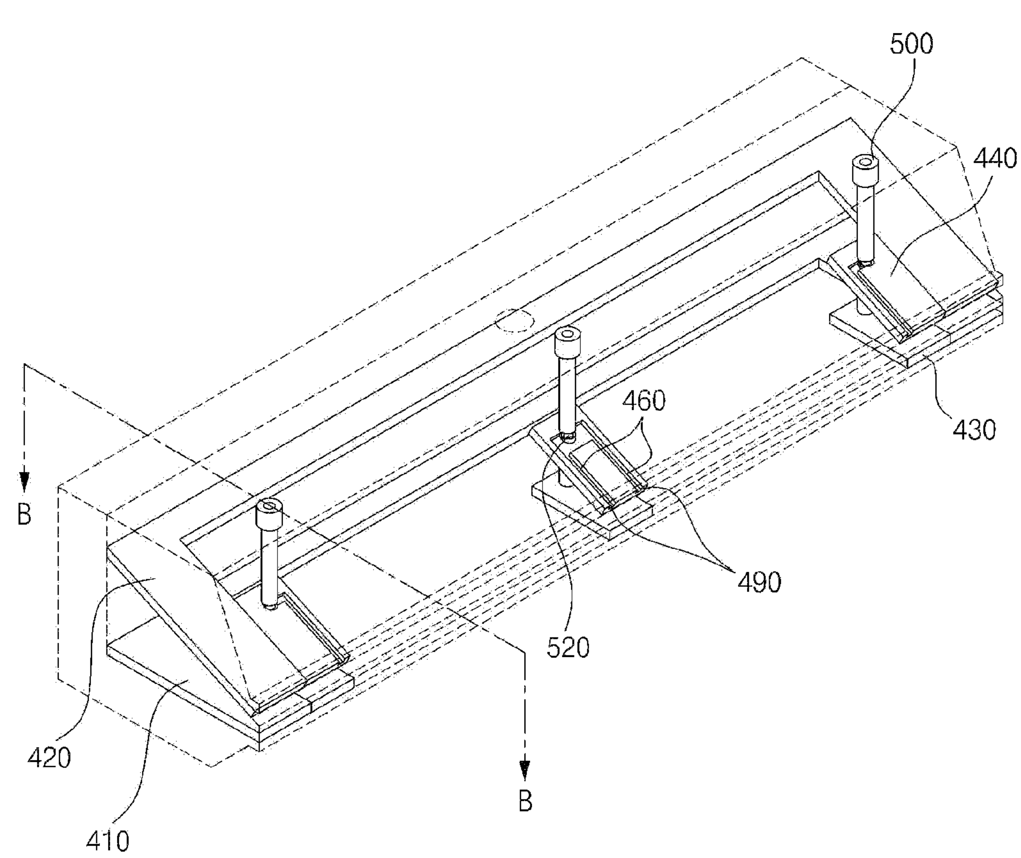

[FIG. 9]
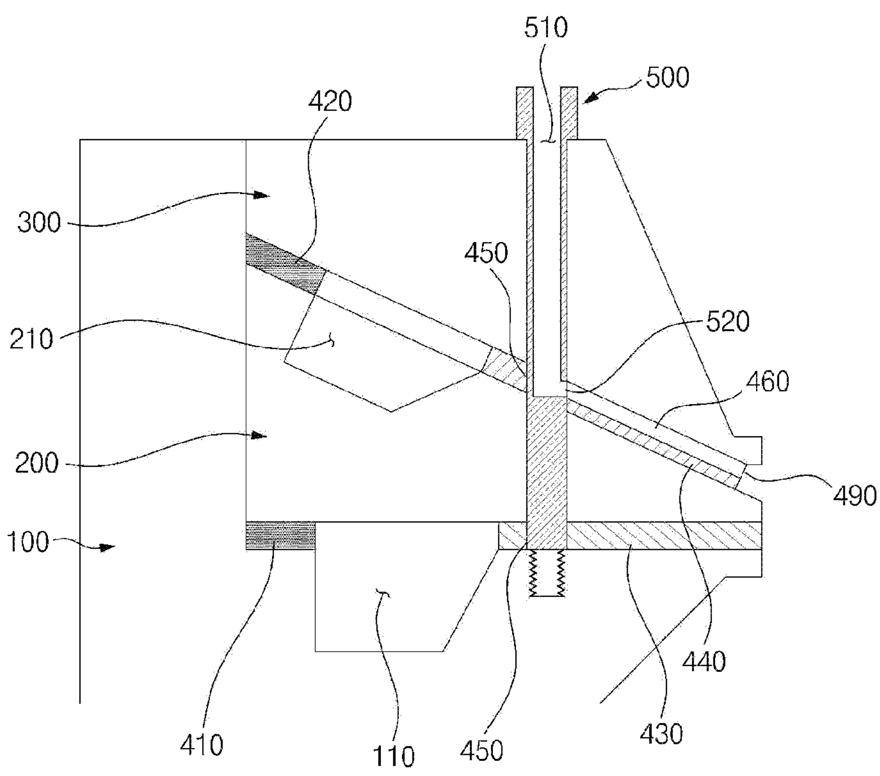

[FIG. 10]
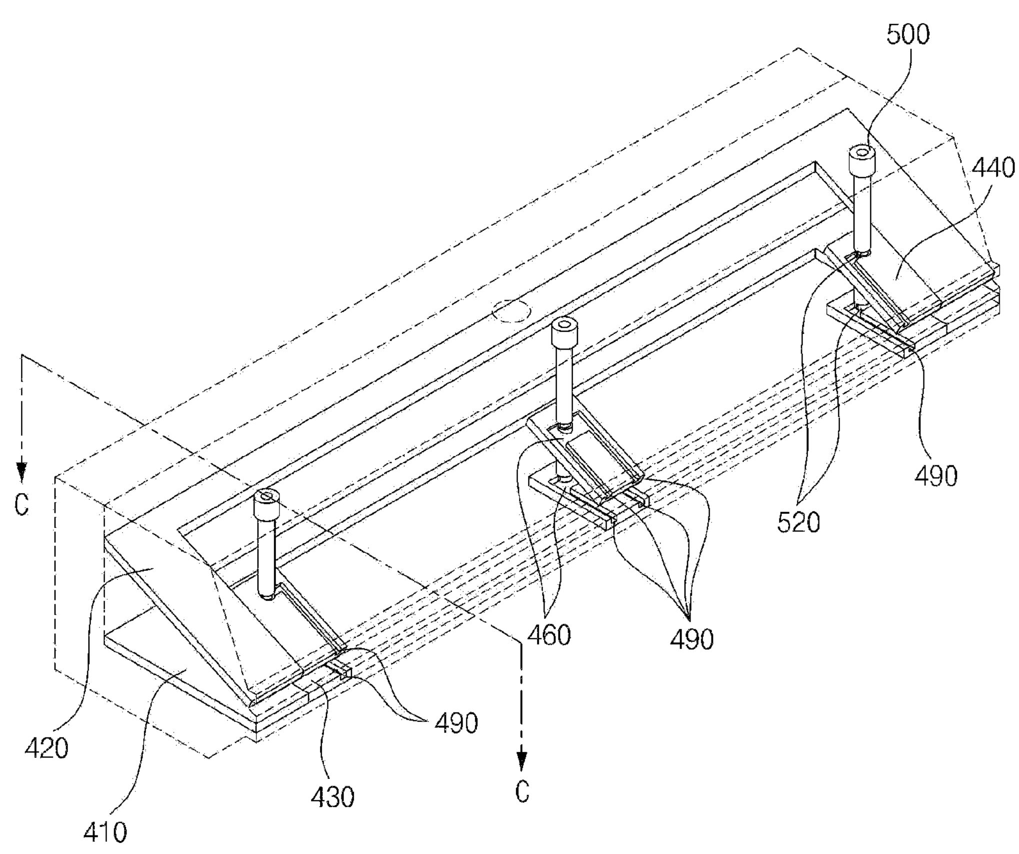

[FIG. 11]
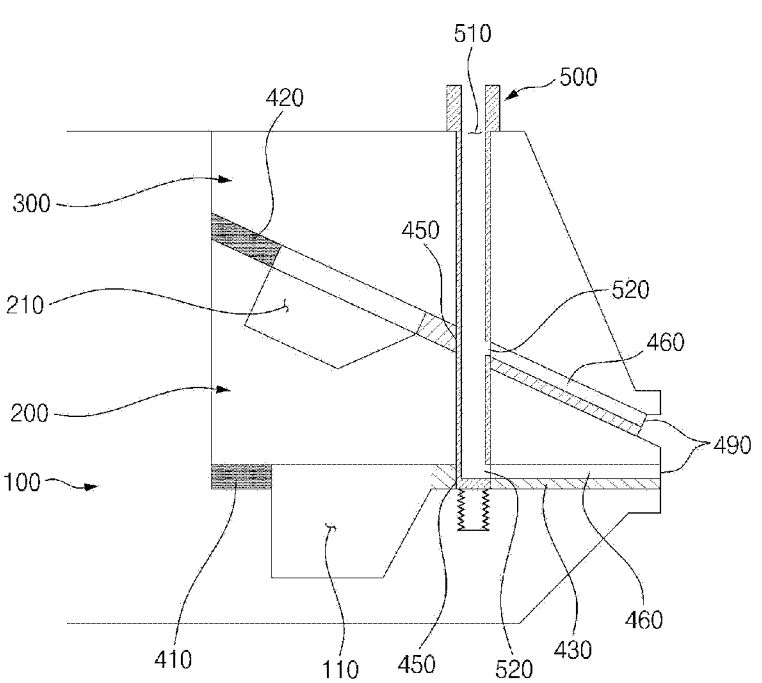

DIE COATER CAPABLE OF MULTI-LAYER COATING OF ACTIVE MATERIALS

TECHNICAL FIELD

The present invention relates to a die coater capable of coating a current collector for a secondary battery with two different liquids in multiple layers at one time.

This application claims the benefit of priority based on Korean Patent Application No. 10-2022-0042443, filed on Apr. 5, 2022, and the entire contents of the Korean patent application are incorporated herein by reference.

BACKGROUND ART

With the development of technology and an increase in demand for mobile devices, the demand for secondary batteries is also rapidly increasing. Among them, lithium secondary batteries have high energy density, high operating voltage, excellent preservation, and excellent lifetime characteristics, and thus are widely used as energy sources of various mobile devices as well as various electronic products.

In the lithium secondary battery, an electrode in which an active material layer and an insulating layer are formed on a surface of a current collector is used. Such an electrode is manufactured by coating a surface of the current collector with both an electrode slurry containing an active material or the like and an insulating liquid containing an insulating material or the like using a coating device such as a die coater such that the electrode slurry and the insulating liquid partially overlap each other at corners of an electrode mixture layer, and drying the coated electrode slurry and the coated insulating liquid.

It is not desirable in terms of production efficiency to separately perform coating with the electrode slurry and the insulating liquid in separate processes. Thus, in order to solve this problem, a technology for simultaneously discharging the electrode slurry and the insulating liquid from one die coater is being developed. For example, the technology of Korean Patent Registration No. 10-2035826 introduces a slot die that simultaneously performs coating with the electrode slurry and the insulating liquid in multiple rows.

Meanwhile, the surface of the current collector may be coated with the active material in two or more layers to improve performance. That is, the performance of the secondary battery may be improved by changing compositions of a lower active material layer that is in direct contact with the surface of the current collector and an upper active material layer covering an upper side of the lower active material layer.

However, the upper active material layer covering the lower active material layer easily slides at corners due to fluidity, and it is very difficult to control such sliding in a coating process. When an N/P ratio is inverted due to the sliding occurring at the corners of the active material layer, lithium precipitation easily occurs, which adversely affects the safety of a battery cell. The N/P ratio is a ratio between capacities of a negative electrode and a positive electrode. In a lithium ion secondary battery using a graphite negative electrode, only when the capacity of the negative electrode is greater than the capacity of the positive electrode, lithium precipitation in the negative electrode can be prevented during overcharging. In this respect, properly controlling of the occurrence of the sliding at the corners of the active material layer is important in securing the safety of the battery cell.

Thus, there is a high need for developing a die coater that may actively respond to various requirements such as simultaneous coating and multi-layer coating with the electrode slurry and the insulating liquid in terms of improving the performance and productivity of the secondary batteries.

RELATED ART DOCUMENTS (Patent Document 001) Korean Patent Registration No. 10-2035826 (announced on Oct. 24, 2019)

(Patent Document 002) Korean Patent Publication No. 10-2021-0155879 (published on Dec. 24, 2021)

DISCLOSURE

Technical Problem

An aspect of the present invention is to provide a die coater capable of simultaneously coating a current collector for a secondary battery with two different liquids in multiple layers.

Further, another aspect of the present invention is to provide a die coater capable of freely adjusting and changing a position of a discharge slit for an insulating liquid.

However, the technical aspects of the present invention are not limited to the aspects described above, and those skilled in the art will clearly understand other unmentioned aspects from the following description of the present invention.

Technical Solution

The present invention relates to a die coater that may simultaneously coat a current collector for a secondary battery with two different liquids in multiple layers, the die coater including a first body provided with a first manifold for accommodating an electrode slurry, a second body provided with a second manifold for accommodating the electrode slurry and coupled to the first body to form a first slit through which the electrode slurry accommodated in the first manifold is discharged, and a third body coupled to the second body to form a second slit through which the electrode slurry accommodated in the second manifold is discharged, wherein the first slit is formed by a first shim and a third shim that are interposed between coupling surfaces of the first body and the second body, and the second slit is formed by a second shim and a fourth shim that are interposed between coupling surfaces of the second body and the third body, and at least any one of the third shim and the fourth shim forms an insulating liquid slit.

The coupling surfaces of the second body and the third body may be inclined in a direction in which the second slit converges with the first slit.

The die coater of the present invention may further include a through bolt that sequentially passes through the third body, the fourth shim, the second body, and the third shim and is screw-coupled to the first body.

A hollow passage may be formed in a lengthwise direction of the through bolt, and an insulating liquid supplied from an outside may be supplied to at least any one of the third shim and the fourth shim through the hollow passage.

The through bolt may have an insulating liquid supply hole communicating with the hollow passage to supply the insulating liquid to a shim for forming the insulating liquid slit among the third shim and the fourth shim.

The shim for forming the insulating liquid slit among the third shim and the fourth shim may be provided with a through hole through which the through bolt passes and an insulating liquid passage groove connected to the through hole to form the insulating liquid slit, and the insulating liquid supply hole of the through bolt may communicate with the insulating liquid passage groove.

A shim not forming the insulating liquid slit among the third shim and the fourth shim may be provided with a through hole through which the through bolt passes, and correspondingly, the through bolt may be not provided with the insulating liquid supply hole in the shim not forming the insulating liquid slit among the third shim and the fourth shim.

The hollow passage of the through bolt may be formed to a depth sufficient for communicating with the insulating liquid supply hole.

The through bolt may apply a pressing force for allowing the third body and the second body to come into close contact with the first body, and accordingly, adhesion in a lip area of the insulating liquid slit may be enhanced.

A width of the first slit may be limited by a width of the third shim, and a width of the second slit may be limited by a width of the fourth shim.

Advantageous Effects

The die coater of the present invention having the above configuration is configured to simultaneously discharge two different liquids, for example, an electrode slurry and an insulating liquid, and in particular, slits through which the electrode slurry and the insulating liquid are discharged are physically separated from each other in the die coater. Accordingly, the die coater of the present invention makes it possible to simultaneously and effectively coat the current collector with two different liquids.

Further, the position and number of insulating liquid slits can be freely adjusted by selectively forming insulating liquid passage grooves for the third shim and the fourth shim. Accordingly, sliding phenomena occurring at corners of an active material layer can be easily adjusted by adjusting the position and number of insulating liquid slits.

Further, since the insulating liquid can be selectively supplied only to a shim having an insulating liquid passage groove through a through hole having a hollow portion, a portion in which there is the likelihood of leakage on a flow path of the insulating liquid can be minimized, and accordingly, internal mixing of the electrode slurry and the insulating liquid can be more effectively suppressed.

However, the technical effects of the present invention are not limited to the effect described above, and those skilled in the art will clearly understand other unmentioned effects from the following description of the present invention.

BRIEF DESCRIPTION OF THE DRAWINGS

The following drawings attached to the present specification illustrate an embodiment of the present invention and serve to further convey the technical spirit of the present invention together with the detailed description of the present invention, which will be made below, and thus the present invention should not be construed as being limited only to the matters described in such drawings.

FIG. 1 is a perspective view illustrating a die coater according to an embodiment of the present invention.

FIG. 2 is an exploded perspective view of the die coater of FIG. 1.

FIG. 3 is a plan view illustrating a first slit in a state in which a second body and a third body are removed.

FIG. 4 is a plan view illustrating a second slit in a state in which the third body is removed.

FIG. 5 is a front view of the die coater of the present invention.

FIG. 6 is a partial perspective view illustrating a die coater according to a first embodiment of the present invention.

FIG. 7 is a cross-sectional view illustrating the die coater along line "A-A" of FIG. 6.

FIG. 8 is a partial perspective view illustrating a die coater according to a second embodiment of the present invention.

FIG. 9 is a cross-sectional view illustrating the die coater along line "B-B" of FIG. 8.

FIG. 10 is a partial perspective view illustrating a die coater according to a third embodiment of the present invention.

FIG. 11 is a cross-sectional view illustrating the die coater along line "C-C" of FIG. 10.

BEST MODE

Since the present invention can be variously changed and may have various embodiments, specific embodiments will be described in detail below.

However, it should be understood that the present invention is not limited to the specific embodiments and includes all changes, equivalents, and substitutions included in the spirit and scope of the present invention.

It should be understood in the present invention that terms such as "include" and "have" are intended to indicate the presence of features, numbers, steps, operations, components, parts, or combinations thereof described in the specification and do not exclude in advance the possibility of the presence or addition of one or more other features, numbers, steps, operations, components, parts, or combinations thereof.

Further, in the present invention, when it is described that a first part such as a layer, a film, a region, and a plate is positioned "above" a second part, this includes not only a case in which the first part is "directly above" the second part but also a case in which a third part is present therebetween. In contrast, when it is described that a first part such as a layer, a film, a region, and a plate is positioned "below" a second part, this includes not only a case in which the first part is "directly below" the second part but also a case in which a third part is present therebetween. Further, in the present application, a state in which a first part is disposed "above" a second part may include not only a state in which the first part is disposed above the second part but also a state in which the first part is disposed below the second part.

The present invention relates to a die coater that may simultaneously coat a current collector for a secondary battery with two different liquids, specifically, an electrode slurry and an insulating liquid, in multiple layers. The die coater of the present invention includes a first body provided with a first manifold for accommodating the electrode slurry, a second body provided with a second manifold for accommodating the electrode slurry and coupled to the first body to form a first slit through which the electrode slurry accommodated in the first manifold is discharged, and a third body coupled to the second body to form a second slit through which the electrode slurry accommodated in the second manifold is discharged.

Here, the first slit is formed by a first shim and a third shim that are interposed between the coupling surfaces of the first body and the second body, the second slit is formed by a second shim and a fourth shim that are interposed between the coupling surfaces of the second body and the third body, and at least any one of the third shim and the fourth shim forms an insulating liquid slit.

The die coater of the present invention having the above configuration is configured to simultaneously discharge two different liquids, for example, the electrode slurry and the insulating liquid, and in particular, slits through which the electrode slurry and the insulating liquid are discharged are physically separated from each other in the die coater. Accordingly, the die coater of the present invention makes it possible to simultaneously and effectively coat the current collector with two different liquids.

Further, the position and number of insulating liquid slits may be freely adjusted by selectively forming insulating liquid passage grooves for the third shim and the fourth shim. Accordingly, sliding phenomena occurring at corners of an active material layer may be easily controlled by adjusting the position and number of insulating liquid slits.

DETAILED DESCRIPTION OF THE PREFERRED EMBODIMENTS

Hereinafter, detailed embodiments of a die coater of the present invention will be described in detail with reference to the accompanying drawings. For reference, a front-rear direction, an up-down direction, or a left-right direction designating relative positions used in the following description is intended to help understanding of the invention and are based on directions illustrated in the drawings unless otherwise defined.

First Embodiment

FIG. 1 is a perspective view illustrating a die coater 10 according to an embodiment of the present invention, and FIG. 2 is an exploded perspective view of the die coater 10 of FIG. 1. The overall configuration of the die coater 10 of the present invention will be described below with reference to FIGS. 1 and 2.

The die coater 10 of the present invention may simultaneously coat a current collector for a secondary battery with an electrode slurry and an insulating liquid in multiple layers. To this end, the die coater 10 of the present invention have a structure in which three bodies of a first body 100, a second body 200, and a third body 300 are coupled.

The first body 100 is a portion constituting a main body of the die coater 10 and is provided with a first manifold 110 for accommodating the electrode slurry. A first slurry inlet 120 communicating with the first manifold 110 is provided in a lower surface of the first body 100, and the electrode slurry supplied from the outside through the first slurry inlet 120 fills the first manifold 110.

The second body 200 is provided with a second manifold 210 for accommodating the electrode slurry and is coupled to the first body 100 to form a first slit 470 through which the electrode slurry accommodated in the first manifold 110 is discharged. Accordingly, the first manifold 110 covered by the second body 200 is sealed.

The third body 300 is coupled to the second body 200 while covering the second manifold 210 to form a second slit 480 through which the electrode slurry accommodated in the second manifold 210 of the second body 200 is discharged. A second slurry inlet 310 communicating with the second manifold 210 is provided in an upper surface of the third body 300, and the electrode slurry supplied through the second slurry inlet 310 fills the second manifold 210.

In this way, the body of the die coater 10 is completed by sequentially coupling the second body 200 and the third body 300 to the first body 100 in multiple layers. Accordingly, the first slit 470 is formed between coupling surfaces of the first body 100 and the second body 200, and the second slit 480 is formed between coupling surfaces of the second body 200 and the third body 300. Further, the coupling surfaces of the second body 200 and the third body 300 are inclined to gather and become closer to each other in a direction in which the second slit 480 converges with the first slit 470. FIG. 5 is a front view of the die coater 10 of the present invention, and as the first slit 470 and the second slit 480 are arranged close to each other, multi-layer coating of the electrode slurry is easily performed.

FIG. 3 is a plan view illustrating the first slit 470 in a state in which the second body 200 and the third body 300 are removed, and FIG. 4 is a plan view illustrating the second slit 480 in a state in which the third body 300 is removed. As illustrated, the first slit 470 is formed by a first shim 410 and a third shim 430 that are interposed between the coupling surfaces of the first body 100 and the second body 200, and the second slit 480 is formed by a second shim 420 and a fourth shim 440 that are interposed between the coupling surfaces of the second body 200 and the third body 300.

A structure in which the first shim 410 and the second shim 420 correspond to each other is provided, and a similar shape thereto in which the third shim 430 and the fourth shim 440 correspond to each other is also provided. Here, the third shim 430 and the fourth shim 440 may be distinguished according to the presence or absence of an insulating liquid slit 490. In the illustrated first embodiment, the insulating liquid slit 490 is formed in the third shim 430 whereas the insulating liquid slit 490 is not formed in the fourth shim 440.

The first shim 410 and the third shim 430 that are interposed between the first body 100 and the second body 200 form a slit having a height suitable for discharging the electrode slurry. The first shim 410 and the third shim 430 form the first slit 470 and the insulating liquid slit 490 separated from each other. That is, the first shim 410 forms the first slit 470 through which the electrode slurry accommodated in the first manifold 110 of the first body 100 is discharged, and the third shim 430 forms the insulating liquid slit 490 through which the insulating liquid provided to pass through the second body 200 and the third body 300 is discharged. A supply path of the insulating liquid for the third shim 430 will be described in detail in the corresponding section.

Since the first shim 410 and the third shim 430 have the same height and do not overlap each other vertically, the first shim 410 and the third shim 430 are disposed to be coplanar between the first body 100 and the second body 200. Thus, upper and lower surfaces of the first shim 410 and the third shim 430 come into close contact with the first body 100 and the second body 200 by a pressing force applied by fastening, for example, bolt fastening, of the first body 100 and the second body 200. Thus, the sealing is maintained.

Since the configurations of the second shim 420 and the fourth shim 440 that are interposed between the second body 200 and the third body 300 correspond to the contents of the first shim 410 and the third shim 430, duplicated descriptions thereof will be omitted. However, in the first embodiment, there is a difference in that the insulating liquid slit

490 is not formed in the fourth shim 440, but according to another embodiment, which will be described below, the insulating liquid slit 490 may be formed in the fourth shim 440 as well.

The die coater 10 of the present invention includes a through bolt 500 that sequentially passes through the third body 300, the fourth shim 440, the second body 200, and the third shim 430 and is screw-coupled to the first body 100. The through bolt 500 is responsible for at least a portion of a fastening force for sealing the first shim 410 to the fourth shim 440 while coupling the first body 100 to the third body 300 with each other. That is, a stronger fastening force may be added by screw-coupling the third body 300 and the second body 200 to the first body 100 with another bolt (not illustrated) other than the through bolt 500, and in particular, the through bolt 500 in the present invention also sequentially passes through the fourth shim 440 and the third shim 430.

The reason why the through bolt 500 sequentially passes through the fourth shim 440 and the third shim 430 is not only to generate a fastening force for the first body 100 but also to supply the insulating liquid to the third shim 430 on a lower side, where the insulating liquid slit 490 is formed. To this end, a hollow passage 510 is formed in a lengthwise direction of the through bolt 500, and the insulating liquid supplied from the outside is supplied to the third shim 430 through the hollow passage 510 of the through bolt 500.

FIG. 6 is a partial perspective view illustrating a die coater according to a first embodiment of the present invention, and FIG. 7 is a cross-sectional view illustrating the die coater along line "A-A" of FIG. 6. As illustrated in the drawing, the through bolt 500 has an insulating liquid supply hole 520 provided in a lower side thereof, which communicates with the hollow passage 510, to supply the insulating liquid to a shim for forming the insulating liquid slit 490 between the third shim 430 and the fourth shim 440, that is, the third shim 430.

Further, the third shim 430 for forming the insulating liquid slit 490 is provided with a through hole 450 through which the through bolt 500 passes and approaches the first body 100 and is provided with an insulating liquid passage groove 460 connected to the through hole 450 to form the insulating liquid slit 490. The insulating liquid passage groove 460 is formed on the third shim 430 in the form of a groove having a bottom surface, and an outlet of the insulating liquid passage groove 460 forms the insulating liquid slit 490. The insulating liquid supply hole 520 of the through bolt 500, which passes through the through hole 450 of the third shim 430, communicates with the insulating liquid passage groove 460 to supply insulating liquid to the third shim 430.

Meanwhile, a shim not forming the insulating liquid slit 490 among the third shim 430 and the fourth shim 440, specifically, the fourth shim 440, is provided with only the through hole 450 through which the through bolt 500 passes, and accordingly, the through bolt 500 passes through the fourth shim 440 and the second body 200 and reaches the third shim 430. Further, the fourth shim 440 does not have the insulating liquid slit 490, and accordingly, the through bolt 500 may not be provided with the insulating liquid supply hole 520 for the fourth shim 440. This is because the unnecessary insulating liquid supply hole 520 merely increases the probability of leakage on the flow path of the insulating liquid.

Further, as illustrated, a tip of the through bolt 500 passing through the through hole 450 of the third shim 430 is screw-coupled to the first body 100. Accordingly, the through bolt 500 applies a pressing force in a direction in which the third body 300 and the second body 200 come into close contact with the first body 100. Accordingly, adhesion in a lip area (corner area) of the insulating liquid slit 490 of the third shim 430 is enhanced so that mixing of the electrode slurry and the insulating liquid is effectively suppressed.

Meanwhile, referring to FIGS. 3 and 4, the width of the first slit 470 formed by the first shim 410 is limited by the width of the third shim 430, and the width of the second slit 480 formed by the second shim 420 is limited by the width of the fourth shim 440. This is because the third shim 430 and the fourth shim 440 block electrode slurry passages of the first slit 470 and the second slit 480 by the widths thereof.

Further, three third shims 430 are arranged on the first slit 470 (the fourth shims 440 also form an arrangement corresponding thereto). The third shims 430 on both sides are provided with one insulating liquid passage groove 460 whereas the third shim 430 in the center is provided with two insulating liquid passage grooves 460. The reason why the central third shim 430 is disposed is that the electrode slurry discharged through the first slit 470 is divided so that active material layers are formed in two rows at one time. Thus, the central third shim 430 is provided with the two insulating liquid passage grooves 460 so that corners of the active material layers on both sides thereof are coated with the insulating liquid.

In an embodiment in which the electrode slurry is not divided, the central third shim 430, the fourth shim 440, and the central through bolt 500 are not required, and those skilled in the art can clearly understand this embodiment only with the accompanying drawings.

Second Embodiment

FIG. 8 is a partial perspective view illustrating a die coater according to a second embodiment of the present invention, and FIG. 9 is a cross-sectional view illustrating the die coater along line "B-B" of FIG. 8.

Contrary to the first embodiment, the second embodiment corresponds to an embodiment in which the insulating liquid passage groove 460 is provided in the fourth shim 440, and the insulating liquid passage groove 460 is not provided in the third shim 430.

Configurations of the second embodiment, which are distinguished from the first embodiment, are changes of the positions of the third shim 430 and the fourth shim 440 and the configuration of the through bolt 500 accompanying these changes, and thus the second embodiment will be described below based on these differences.

No insulating liquid passage groove 460 and only the through hole 450 through which the through bolt 500 passes is formed in the third shim 430 positioned on the first slit 470, and the through hole 450 and the insulating liquid passage groove 460 connected to the through hole 450 are formed in the fourth shim 440 disposed on the second slit 480. That is, the insulating liquid is discharged on the same plane as the electrode slurry discharged through the second slit 480 positioned above in the die coater 10. Thus, as compared to the first embodiment, the second embodiment is an advantageous embodiment for controlling a sliding phenomenon when an excessive sliding phenomenon occurs in an upper active material layer formed by the second slit 480.

Further, in the through bolt 500, the insulating liquid supply hole 520 is formed at a point corresponding to the insulating liquid passage groove 460 of the fourth shim 440 to supply the insulating liquid to the fourth shim 440, and the insulating liquid supply hole 520 is not formed in the third shim 430. The configuration of the through bolt 500 in the second embodiment is clearly understood when compared with the previous drawings.

In addition, it may be preferable in view of the strength of the through bolt 500 that the hollow passage 510 of the through bolt 500 is formed to a depth sufficient for communicating with the insulating liquid supply hole 520 in the fourth shim 440 and is not formed therebelow (toward the third shim).

Third Embodiment

FIG. 10 is a partial perspective view illustrating a die coater according to a third embodiment of the present invention, and FIG. 11 is a cross-sectional view illustrating the die coater along line "C-C" of FIG. 10.

The illustrated third embodiment relates to a case in which the insulating liquid passage groove 460 is formed in both the third shim 430 and the fourth shim 440. Thus, in the third embodiment, the insulating liquid is discharged in multiple layers together with the electrode slurry discharged through the first slit 470 and the second slit 480. In this respect, the third embodiment may be an embodiment for controlling sliding phenomena for both upper and lower active material layers.

Further, the insulating liquid supply holes 520 are formed at two points of the through bolt 500, which correspond to the insulating liquid passage grooves 460 of the third shim 430 and the fourth shim 440, to supply the insulating liquid to both the third shim 430 and the fourth shim 440. The configuration of the through bolt 500 in the third embodiment is also clearly understood from the drawings.

In the embodiment of the drawing, the insulating liquid is supplied through a head part of the through bolt 500 inserted toward the first body 100 from the third body 300 on an upper side. In the third embodiment, after the insulating liquid is first supplied to the fourth shim 440 on an upper side, the remaining insulating liquid is supplied to the third shim 430 on a lower side. Thus, in order to supply the insulating liquid at a more uniform flow rate, it may be considered that a cross-sectional flow area of the insulating liquid supply hole 520 for the fourth shim 440 is designed to be smaller than a cross-sectional flow area of the insulating liquid supply hole 520 for the third shim 430.

In this way, the die coater 10 of the present invention makes it possible to actively and effectively respond to the sliding phenomenon of the active material layer that occurs in various aspects without changing other important design elements of the die coater 10 only by appropriately selecting the third shim 430 and the fourth shim 440 with or without the insulating liquid passage groove 460 according to a situation and using the corresponding through bolt 500.

Hereinabove, the present invention has been described in more detail through drawings, embodiments, and the like. However, since configurations described in the drawings or the embodiments described in the present specification are merely the embodiments of the present invention and do not represent all the technical spirit of the present invention, it should be understood that there may be various equivalents and variations that may replace the configurations are present at filling of the present application.

[Description of Reference Numerals]

| | |
|---|---|
| 10: Die coater | 100: First body |
| 110: First manifold | 120: First slurry inlet |
| 200: Second body | 210: Second manifold |
| 300: Third body | 310: Second slurry inlet |
| 410: First shim | 420: Second shim |
| 430: Third shim | 440: Fourth shim |
| 450: Through hole | 460: Insulating liquid passage groove |
| 470: First slit | 480: Second slit |
| 490: Insulating liquid slit | 500: Through bolt |
| 510: Hollow passage | 520: Insulating liquid supply hole |

INDUSTRIAL APPLICABILITY

The present invention is a technology related to a die coater useful for manufacturing a current collector for a secondary battery.

The invention claimed is:

1. A die coater comprising:

a first body having a first manifold for accommodating an electrode slurry;

a second body having a second manifold for accommodating the electrode slurry and coupled to the first body, so as to form a first slit through which the electrode slurry accommodated in the first manifold is configured to be discharged; and a third body coupled to the second body, so as to form a second slit through which the electrode slurry accommodated in the second manifold is configured to be discharged, wherein the first slit is an opening disposed between a first shim and a third shim that are interposed between coupling surfaces of the first body and the second body, and the second slit is an opening disposed between a second shim and a fourth shim that are interposed between coupling surfaces of the second body and the third body, and wherein at least one of the third shim or the fourth shim include an insulating liquid slit.

2. The die coater of claim 1, wherein the coupling surfaces of the second body and the coupling surfaces of the third body include an upper coupling surface and a lower coupling surface, wherein the upper coupling surface of the second body and the lower coupling surface of the third body are inclined in a direction in which the second slit converges with the first slit.

3. The die coater of claim 1, further comprising a through bolt that sequentially passes through the third body, the fourth shim, the second body, and the third shim, respectively, and wherein the through bolt is screw-coupled to the first body.

4. The die coater of claim 3, wherein a hollow passage extends in a lengthwise direction of the through bolt, and an insulating liquid is configured to be supplied from an exterior of the die coater to at least one of the third shim or the fourth shim through the hollow passage.

5. The die coater of claim 4, wherein the through bolt has an insulating liquid supply hole communicating with the hollow passage, wherein the insulating liquid supply hole and the hollow passage are configured to supply the insulating liquid to the insulating liquid slit of at least one of the third shim and the fourth shim.

6. The die coater of claim 5, wherein at least one of the third shim or the fourth shim is provided with a through hole and an insulating liquid passage groove, wherein the through bolt passes through the through hole and an that is coupled to a first end of the insulating liquid passage groove, wherein a second end of the insulating liquid passage groove is coupled to the insulating liquid slit, and wherein the insulating liquid supply hole of the through bolt communicates with the insulating liquid passage groove.

7. The die coater of claim 5, wherein at least one of the third shim and the fourth shim is not provided with the insulating liquid slit, and is provided with the through hole through which the through bolt passes.

8. The die coater of claim 7, wherein the through bolt is not provided with the insulating liquid supply hole in at least one of the third shim or the fourth shim not provided with the insulating liquid slit.

9. The die coater of claim 6, wherein the hollow passage of the through bolt extends to a sufficient depth, so as to communicate with the insulating liquid supply hole.

10. The die coater of claim 1, wherein a through bolt applies a pressing force to the third body and the second body, so as to contact the first body, and, enhance adhesion in a lip area of the insulating liquid slit.

11. The die coater of claim 1, wherein a width of the first slit is limited by a width of the third shim.

12. The die coater of claim 1, wherein a width of the second slit is limited by a width of the fourth shim.

* * * * *